United States Patent
Terry et al.

(10) Patent No.: US 10,015,612 B2
(45) Date of Patent: Jul. 3, 2018

(54) MEASUREMENT, VERIFICATION AND CORRECTION OF TIME ALIGNMENT OF MULTIPLE AUDIO CHANNELS AND ASSOCIATED METADATA

(71) Applicant: DOLBY LABORATORIES LICENSING CORPORATION, San Francisco, CA (US)

(72) Inventors: Kent Bennett Terry, Burlingame, CA (US); Scott Gregory Norcross, San Rafael, CA (US); Jeffrey Riedmiller, Penngrove, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 15/603,102

(22) Filed: May 23, 2017

(65) Prior Publication Data
US 2017/0347215 A1 Nov. 30, 2017

Related U.S. Application Data

(60) Provisional application No. 62/341,474, filed on May 25, 2016.

(51) Int. Cl.
*H04S 3/00* (2006.01)
*G10L 25/51* (2013.01)

(52) U.S. Cl.
CPC .............. *H04S 3/008* (2013.01); *G10L 25/51* (2013.01); *H04S 2400/01* (2013.01)

(58) Field of Classification Search
CPC ....... G10L 25/51; G10L 19/00; G10L 19/167; H04S 2400/01; H04S 3/008; G06F 3/165; H04R 3/00; H04R 29/00; H04R 2430/00
See application file for complete search history.

(56) References Cited

U.S. PATENT DOCUMENTS

| | | |
|---|---|---|
| 6,446,037 B1 | 9/2002 | Fielder |
| 6,980,731 B1 | 12/2005 | Tahara |
| 2002/0083060 A1* | 6/2002 | Wang ................ G06F 17/30743 |
| 2004/0234000 A1 | 11/2004 | Page |
| 2005/0177372 A1 | 8/2005 | Wang |

(Continued)

FOREIGN PATENT DOCUMENTS

| | | |
|---|---|---|
| WO | 2014/128275 | 8/2014 |
| WO | 2015/038546 | 3/2015 |
| WO | 2015/105400 | 7/2015 |

OTHER PUBLICATIONS

Anderson R. et al, "Introduction to Dolby digital plus, an enhancement to the Dolby digital coding system", Audio Engineering Society Convention 117, Audio Engineering Society, Convention Paper 6196, Oct. 2004.

*Primary Examiner* — Thang Tran

(57) ABSTRACT

Some methods may involve receiving a block of audio data, the block including N pulse code modulated (PCM) audio channels, including audio samples for each of the N channels, receiving metadata associated with the block of audio data and receiving a first set of values corresponding to reference audio samples. A second set of values, corresponding to audio samples from the block of audio data, may be determined. The first and second set of values may be compared. Based on the comparison, it may be determined whether the block of audio data is synchronized with the metadata.

20 Claims, 5 Drawing Sheets

(56) References Cited

U.S. PATENT DOCUMENTS

| | | |
|---|---|---|
| 2007/0208571 A1* | 9/2007 | Lemieux ............... G10L 19/167 704/500 |
| 2008/0013614 A1 | 1/2008 | Fiesel et al. |
| 2008/0114477 A1* | 5/2008 | Wu ....................... G10L 19/008 700/94 |
| 2008/0273707 A1 | 11/2008 | Kentish |
| 2008/0275697 A1 | 11/2008 | Kentish |
| 2009/0044072 A1 | 2/2009 | Oh |
| 2011/0052136 A1 | 3/2011 | Homan |
| 2011/0087794 A1 | 4/2011 | Li |
| 2011/0128445 A1 | 6/2011 | Carrieres |
| 2011/0208528 A1 | 8/2011 | Schildbach |
| 2011/0261257 A1 | 10/2011 | Terry |
| 2012/0215329 A1 | 8/2012 | Jiang |
| 2012/0237039 A1 | 9/2012 | Thesing |
| 2012/0243692 A1 | 9/2012 | Ramamoorthy |
| 2013/0128115 A1 | 5/2013 | Oostveen |
| 2013/0162902 A1 | 6/2013 | Musser, Jr. |
| 2013/0222690 A1 | 8/2013 | Kim |
| 2013/0246077 A1* | 9/2013 | Riedmiller ............ G10L 19/008 704/500 |
| 2014/0108020 A1 | 4/2014 | Sharma |
| 2014/0156288 A1 | 6/2014 | Scharrer |
| 2015/0325243 A1* | 11/2015 | Grant .................... G10L 19/167 704/229 |
| 2015/0348558 A1 | 12/2015 | Riedmiller |
| 2016/0064003 A1* | 3/2016 | Mehta ....................... H04S 7/30 381/23 |
| 2016/0196830 A1* | 7/2016 | Riedmiller ............ G10L 19/167 704/500 |
| 2016/0307580 A1* | 10/2016 | Riedmiller ............ G10L 19/167 |
| 2017/0243590 A1* | 8/2017 | Fersch ..................... H04S 7/30 |

* cited by examiner

MEASUREMENT, VERIFICATION AND CORRECTION OF TIME ALIGNMENT OF MULTIPLE AUDIO CHANNELS AND ASSOCIATED METADATA

CROSS-REFERENCE TO RELATED APPLICATION

This application claims priority from U.S. Patent Application No. 62/341,474 filed May 25, 2016 which is hereby incorporated by reference in its entirety.

TECHNICAL FIELD

This disclosure relates to audio data processing. In particular, this disclosure relates to the synchronization of audio data.

BACKGROUND

As the number of channels increases and the loudspeaker layout transitions from a planar two-dimensional (2D) array to a three-dimensional (3D) array including height speakers, the tasks of authoring and rendering sounds are becoming increasingly complex. In some instances, the increased complexity has involved a commensurate increase in the amount of audio data that needs to be stored and/or streamed. In some examples, audio data time alignment issues (which are also referred to herein as synchronization issues) may become more complex and challenging. Such audio data time alignment issues may be particularly challenging in the context of transmitting and receiving data between media processing nodes of a broadcast network. Improved methods and devices would be desirable.

SUMMARY

As described in detail herein, in some implementations a method of processing audio data may involve receiving a block of audio data and receiving metadata associated with the block of audio data. The block may include N pulse code modulated (PCM) audio channels. The block may include audio samples for each of the N channels. The method may involve receiving a first set of values corresponding to reference audio samples. In some examples, the method may involve determining a second set of values corresponding to audio samples from the block of audio data, making a comparison of the second set of values corresponding to audio samples and the first set of values corresponding to reference audio samples, and determining, based on the comparison, whether the block of audio data is synchronized with the metadata. In some examples, the metadata may include position data.

The first set of values corresponding to reference audio samples may have been obtained at a reference time at which the metadata was synchronized with corresponding audio data. In some examples, the first set of values corresponding to reference audio samples may include a value corresponding to at least one sample from at least one of the N channels. In some implementations, the value corresponding to at least one sample may correspond to a subset of a total number of bits of the at least one sample. For example, the subset may include a number, which may be referred to herein as B, of most significant bits of at least one sample.

In some examples, the first set of values and the second set of values may be determined in the same manner or substantially the same manner. For example, determining the first set of values and determining the second set of values may both involve processing the same number of samples per channel, processing the same number of bits per sample, determining the value corresponding to a same sample number and/or determining the same audio metric.

According to some examples, determining the second set of values may involve determining a value corresponding to the same sample number in at least one of the N channels. Determining the second set of values may involve determining a value corresponding to the first sample of the block in at least one of the N channels. In some implementations, determining the second set of values may involve determining an audio metric for at least one of the N channels. A location of an audio metric may, for example, be a location of a peak sample value for the block or a location of a first zero crossing for the block.

According to some implementations, the first set of values may include a first block metric for at least one channel. The first block metric being based on two or more reference audio samples of at least one reference channel of a reference block of audio data. Such methods may involve determining a second block metric for at least one channel of the block of audio data. The second block metric may be based on two or more samples of at least one channel. Determining whether the block of audio data is synchronized with the metadata may be based, at least in part, on a comparison of the first block metric with the second block metric. In some examples, the first block metric and the second block metric may be based, at least in part, on a root mean square (RMS) of sample values in a block, a frequency-weighted RMS value and/or a loudness metric.

According to some implementations, the above-described methods may be performed at a measurement point. Some such implementations may involve determining, at a reference point and during a reference time before the block of audio data was received, the first set of values corresponding to the reference audio samples. The reference time may be a time during which the metadata was synchronized with reference audio data. Some such implementations may involve associating the first set of values with the metadata and transmitting the first set of values, at least one block of the reference audio data and the metadata from the reference point to the measurement point.

Some or all of the methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. For example, the software may include instructions for controlling one or more devices for receiving a block of audio data and receiving metadata associated with the block of audio data. The block may include N pulse code modulated (PCM) audio channels. The block may include audio samples for each of the N channels. The software may include instructions for receiving a first set of values corresponding to reference audio samples. In some examples, the software may include instructions for determining a second set of values corresponding to audio samples from the block of audio data, making a comparison of the second set of values corresponding to audio samples and the first set of values corresponding to reference audio samples, and determining, based on the comparison, whether the block of audio data is synchronized with the metadata. In some examples, the metadata may include position data.

The first set of values corresponding to reference audio samples may have been obtained at a reference time at which the metadata was synchronized with corresponding audio data. In some examples, the first set of values corresponding to reference audio samples may include a value corresponding to at least one sample from at least one of the N channels. In some implementations, the value corresponding to at least one sample may correspond to a subset of a total number of bits of the at least one sample. For example, the subset may include a number, which may be referred to herein as B, of most significant bits of at least one sample.

In some examples, the first set of values and the second set of values may be determined in the same manner or substantially the same manner. For example, determining the first set of values and determining the second set of values may both involve processing the same number of samples per channel, processing the same number of bits per sample, determining the value corresponding to a same sample number and/or determining the same audio metric.

According to some examples, determining the second set of values may involve determining a value corresponding to the same sample number in at least one of the N channels. Determining the second set of values may involve determining a value corresponding to the first sample of the block in at least one of the N channels. In some implementations, determining the second set of values may involve determining an audio metric for at least one of the N channels. A location of an audio metric may, for example, be a location of a peak sample value for the block or a location of a first zero crossing for the block.

According to some implementations, the first set of values may include a first block metric for at least one channel. The first block metric being based on two or more reference audio samples of at least one reference channel of a reference block of audio data. The software may include instructions for determining a second block metric for at least one channel of the block of audio data. The second block metric may be based on two or more samples of at least one channel. Determining whether the block of audio data is synchronized with the metadata may be based, at least in part, on a comparison of the first block metric with the second block metric. In some examples, the first block metric and the second block metric may be based, at least in part, on a root mean square (RMS) of sample values in a block, a frequency-weighted RMS value and/or a loudness metric.

At least some aspects of this disclosure may be implemented in an apparatus that includes an interface system and a control system. The control system may include at least one of a general purpose single- or multi-chip processor, a digital signal processor (DSP), an application specific integrated circuit (ASIC), a field programmable gate array (FPGA) or other programmable logic device, discrete gate or transistor logic, or discrete hardware components. The interface system may include a network interface. In some implementations, the apparatus may include a memory system. The interface system may include an interface between the control system and at least a portion of (e.g., at least one memory device of) the memory system.

The control system may be capable of receiving, via the interface system, a block of audio data and metadata associated with the block of audio data. The block may include N pulse code modulated (PCM) audio channels. The block may include audio samples for each of the N channels. The control system may be capable of receiving, via the interface system, a first set of values corresponding to reference audio samples. In some examples, the control system may be capable of determining a second set of values corresponding to audio samples from the block of audio data, making a comparison of the second set of values corresponding to audio samples and the first set of values corresponding to reference audio samples, and determining, based on the comparison, whether the block of audio data is synchronized with the metadata. In some examples, the metadata may include position data.

The first set of values corresponding to reference audio samples may have been obtained at a reference time at which the metadata was synchronized with corresponding audio data. In some examples, the first set of values corresponding to reference audio samples may include a value corresponding to at least one sample from at least one of the N channels. In some implementations, the value corresponding to at least one sample may correspond to a subset of a total number of bits of the at least one sample. For example, the subset may include a number, which may be referred to herein as B, of most significant bits of at least one sample.

In some examples, the first set of values and the second set of values may be determined in the same manner or substantially the same manner. For example, determining the first set of values and determining the second set of values may both involve processing the same number of samples per channel, processing the same number of bits per sample, determining the value corresponding to a same sample number and/or determining the same audio metric.

According to some examples, determining the second set of values may involve determining a value corresponding to the same sample number in at least one of the N channels. Determining the second set of values may involve determining a value corresponding to the first sample of the block in at least one of the N channels. In some implementations, determining the second set of values may involve determining an audio metric for at least one of the N channels. A location of an audio metric may, for example, be a location of a peak sample value for the block or a location of a first zero crossing for the block.

According to some implementations, the first set of values may include a first block metric for at least one channel. The first block metric being based on two or more reference audio samples of at least one reference channel of a reference block of audio data. The control system may be capable of determining a second block metric for at least one channel of the block of audio data. The second block metric may be based on two or more samples of at least one channel. Determining whether the block of audio data is synchronized with the metadata may be based, at least in part, on a comparison of the first block metric with the second block metric. In some examples, the first block metric and the second block metric may be based, at least in part, on a root mean square (RMS) of sample values in a block, a frequency-weighted RMS value and/or a loudness metric.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DESCRIPTION OF EXAMPLE EMBODIMENTS

Figure 1:
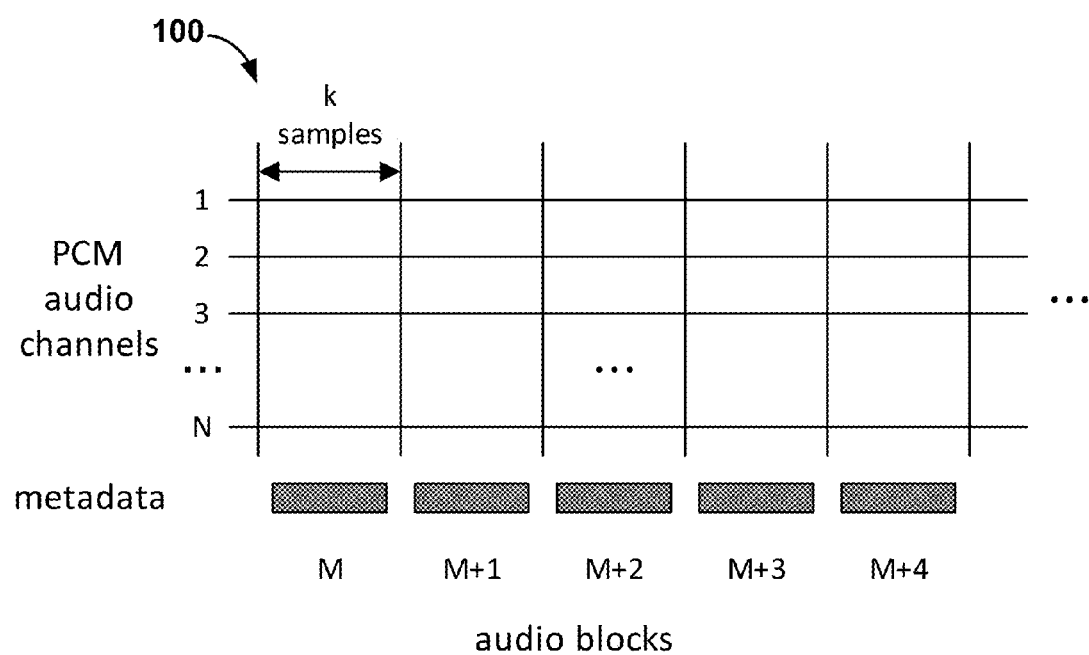
FIG. 1 shows an example of audio channels and associated metadata.

The following description is directed to certain implementations for the purposes of describing some innovative aspects of this disclosure, as well as examples of contexts in which these innovative aspects may be implemented. However, the teachings herein can be applied in various different ways. Accordingly, the teachings of this disclosure are not intended to be limited to the implementations shown in the figures and/or described herein, but instead have wide applicability.

As used herein, the term "audio object" may refer to a stream of audio data signals and associated metadata. The metadata may indicate one or more of the position of the audio object, the apparent size of the audio object, rendering constraints as well as content type (e.g. dialog, effects), etc. Depending on the implementation, the metadata may include other types of data, such as gain data, trajectory data, etc. Some audio objects may be static, whereas others may move. Audio object details may be authored or rendered according to the associated metadata which, among other things, may indicate the position of the audio object in a two-dimensional space or a three-dimensional space at a given point in time. When audio objects are monitored or played back in a reproduction environment, the audio objects may be rendered according to their position metadata and possibly other metadata, such as size metadata, according to the reproduction speaker layout of the reproduction environment.

In some instances audio data that includes associated metadata may be in the form of pulse code modulated (PCM) audio data. To produce PCM audio data, the amplitude of an analog audio signal is sampled regularly at uniform intervals. Each sample may be quantized to the nearest value within a range of digital steps. Linear pulse-code modulation (LPCM) is a specific type of PCM in which the quantization levels are linearly uniform. With other types of PCM audio data, quantization levels may vary as a function of amplitude. In some examples, the dynamic range of an analog signal may be modified for digitizing to produce PCM audio data. Examples include PCM audio data produced according to the G.711 standard of the International Telecommunication Union's Telecommunication Standardization Sector (ITU-T), such as PCM audio data produced according to the A-law algorithm or the μ-law algorithm.

For example, the audio data may be segmented into blocks of PCM audio data, including audio samples for each of the blocks. Some use cases contemplated by the inventors may involve transmitting and receiving multiple channels of PCM audio data in professional production workflows, for example, between media processing nodes. Such media processing nodes may, in some implementations, be part of a broadcast network. Such audio data may be encoded in any form during transmission, but for the purpose of describing many of the methods disclosed herein, it will be assumed that the audio data is represented in PCM form.

In the context of this disclosure, an "audio program" is considered to be a set of one or more audio signals that are intended to be reproduced simultaneously as part of a single presentation. Time alignment of audio channels that are part of an audio program is known to be important in the production and presentation of the audio program. As noted elsewhere herein, an audio program may include metadata that is associated with the audio signals, including metadata that may affect the reproduction of the audio signals. For at least some types of metadata, time alignment is likewise known to be important in the production and presentation of the audio program. For example, if an audio program includes a segment during which a bird is intended to be flying overhead, it would thwart the intention of the content creator and would be disconcerting to the listener(s) if instead the reproduced sounds indicated that a lawnmower were flying overhead. This disclosure describes methods for measuring, verifying, and correcting time alignment of multiple audio channels and metadata that are part of an audio program.

FIG. 1 shows an example of audio channels and associated metadata. In this example, the audio data includes N channels of PCM audio data, which may be any type of PCM audio data disclosed herein or otherwise known by those of ordinary skill in the art. Here, the audio data is segmented into blocks, each of which includes k samples. The block boundaries are indicated by vertical lines in FIG. 1. In the example shown in FIG. 1, M represents a particular block index.

In this example, metadata associated with the N channels of audio data is grouped together and likewise segmented in blocks, such that each block of metadata is associated with each block of k audio samples. In some instances, the metadata may apply to audio data outside the range of a given block. However, in this example the metadata is sent on a block basis and, for the purposes of this discussion, the metadata will be described as "associated" with the block of audio data with which it is transmitted.

Various methods disclosed herein involve a reference point (also referred to herein as a reference node) at which audio channels and metadata are known to be synchronized. Samples of the synchronized audio data may sometimes be referred to herein as "reference audio samples." The audio channels and metadata may be transmitted in some manner between nodes of a network. In some instances, the time alignment between the audio channels and metadata and/or the time alignment between the audio channels themselves may be altered. In some methods disclosed herein, data corresponding with the time alignment at the reference point may be determined and may be transmitted with the audio channels and metadata. The data corresponding with the time alignment at the reference point may be based, at least in part, on reference audio samples. Accordingly, the data corresponding with the time alignment at the reference point may sometimes be referred to herein as "values corresponding to reference audio samples." Various examples of values corresponding to reference audio samples are disclosed herein.

At a measurement point of the network (also referred to herein as a measurement node), the audio data, metadata and the values corresponding to reference audio samples may be received. Such data may sometimes be received directly from a reference node. In some examples, there may be multiple nodes between the reference node and the measurement node. At the measurement node, the time alignment may be measured, verified, and/or corrected if required. In some implementations, the measurement node may determine whether audio data is synchronized with corresponding metadata based, at least in part, on received values corresponding to reference audio samples. Various examples of using the values corresponding to reference audio samples at a measurement node are disclosed herein.

Figure 2:
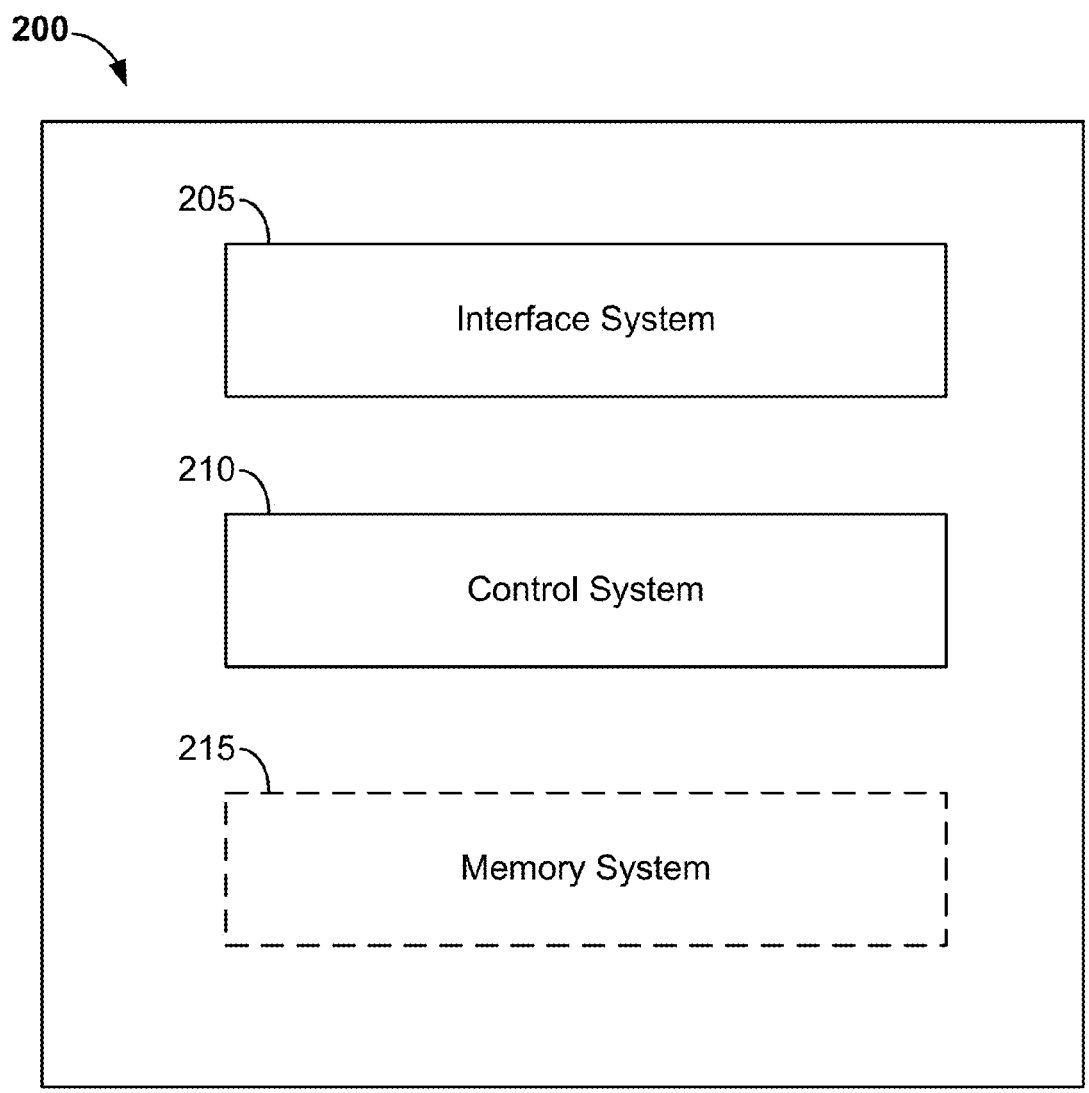
FIG. 2 is a block diagram that provides examples of components of an apparatus capable of implementing various methods described herein.

FIG. 2 is a block diagram that provides examples of components of an apparatus capable of implementing various methods described herein. The apparatus 200 may, for example, be (or may be a portion of) an audio data processing system. In some implementations, the apparatus 200 may be an instance of, or a portion of, a media processing node. The media processing node may, in some examples, be a node of a broadcast network. According to some implementations, the apparatus 200 may be a server. In some examples, the apparatus 200 may be implemented in a component of a device, such as a line card of a server. Accordingly, in some implementations the apparatus 200 may be capable of performing the functions of a measurement node as disclosed herein. In some examples, the apparatus 200 may be capable of performing the functions of a reference node as disclosed herein.

In this example, the apparatus 200 includes an interface system 205 and a control system 210. The control system 210 may be capable of implementing, at least in part, the methods disclosed herein. The control system 210 may, for example, include a general purpose single- or multi-chip processor, a digital signal processor (DSP), an application specific integrated circuit (ASIC), a field programmable gate array (FPGA) or other programmable logic device, discrete gate or transistor logic, and/or discrete hardware components.

In this implementation, the apparatus 200 includes a memory system 215. The memory system 215 may include one or more suitable types of non-transitory storage media, such as flash memory, a hard drive, etc. The interface system 205 may include a network interface, an interface between the control system and the memory system and/or an external device interface (such as a universal serial bus (USB) interface). Although the memory system 215 is depicted as a separate element in FIG. 2, the control system 210 may include at least some memory, which may be regarded as a portion of the memory system. Similarly, in some implementations the memory system 215 may be capable of providing at least some control system functionality.

In this example, the control system 210 is capable of receiving audio data and other information via the interface system 205. In some implementations, the control system 210 may include (or may implement), an audio processing apparatus such as those described herein.

In some implementations, the control system 210 may be capable of performing at least some of the methods described herein according to software, which may be stored one or more non-transitory media. The non-transitory media may include memory associated with the control system 210, such as random access memory (RAM) and/or read-only memory (ROM). In some examples, the non-transitory media may include memory of the memory system 215. In some implementations, the control system 210 may be capable of sending and receiving data, including but not limited to software program code, via the interface system 205. For example, the control system 210 may be capable of requesting a software program from another device, such as a server, that is accessible on a network via the interface system 205. The received software program may be executed by the control system 210 as it is received, and/or stored in a storage device for later execution. According to some examples, the control system 210 may be implemented in more than one device. For example, some of the functionality described herein may be provided in a first device, such as a media processing node, and other functionality may be provided by a second device, such as a server, in response to a request from the first device.

Figure 3:
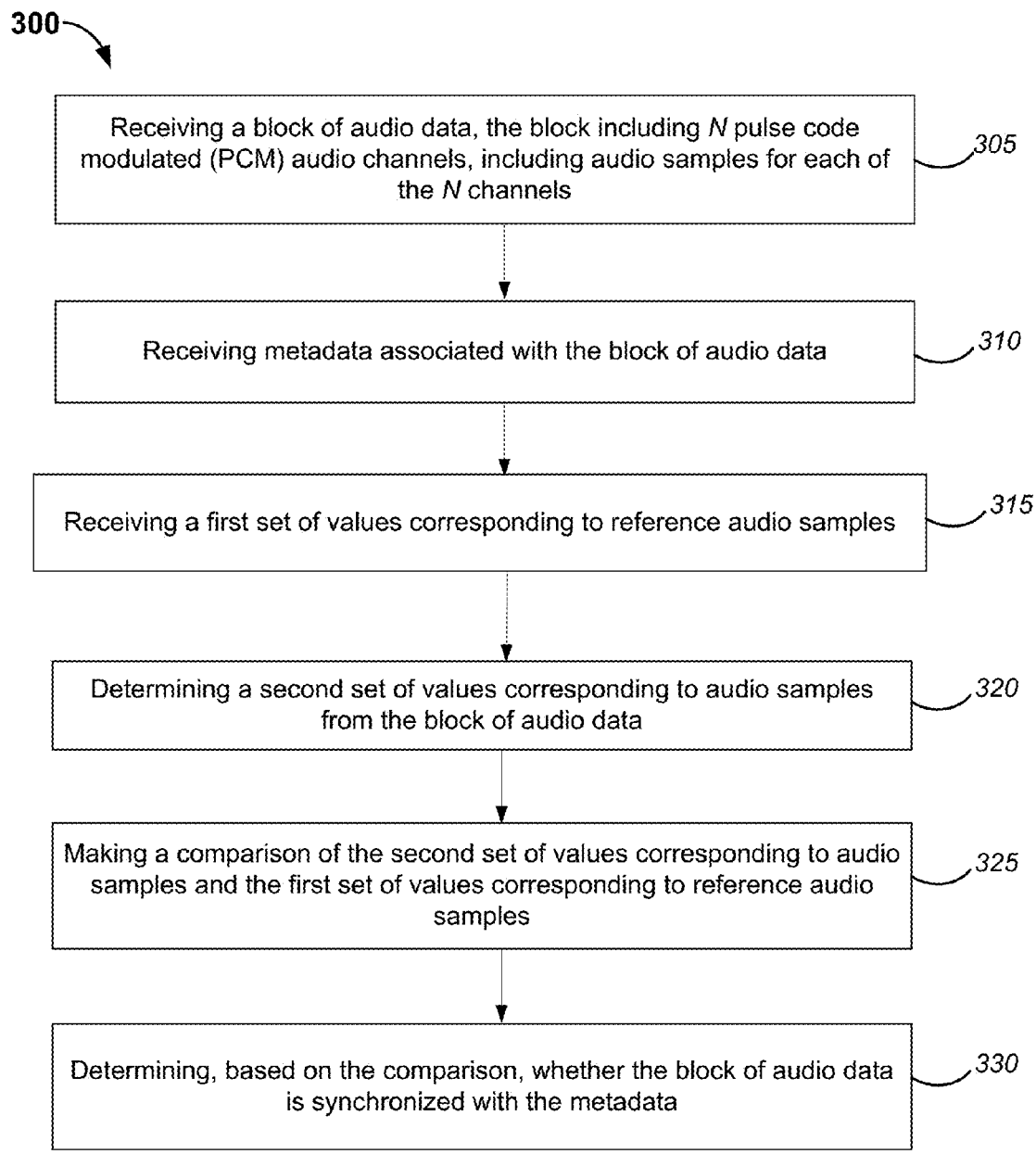
FIG. 3 is a flow diagram that shows example blocks of a method according to some disclosed implementations.

FIG. 3 is a flow diagram that shows example blocks of a method according to some disclosed implementations. The blocks of method 300 provide an example of measurement node functionality. However, some associated methods disclosed herein may be performed at a reference point. The blocks of FIG. 3 (and those of other flow diagrams provided herein) may, for example, be performed by the control system 210 of FIG. 2 or by a similar apparatus. Accordingly, some blocks of FIG. 3 are described below with reference to one or more elements of FIG. 2. As with other methods disclosed herein, the method outlined in FIG. 3 may include more or fewer blocks than indicated. Moreover, the blocks of methods disclosed herein are not necessarily performed in the order indicated.

Here, block 305 involves receiving a block of audio data. In this example, the block includes N PCM audio channels, including audio samples for each of the N channels.

In this example, block 310 involves receiving metadata associated with the block of audio data that is received in block 305. As noted elsewhere herein, the metadata may in some examples be associated with one or more other blocks of audio data. The metadata received in block 310 may, for example, indicate the position of an audio object, the apparent size of an audio object, rendering constraints, content type (e.g. dialog, effects), etc. Depending on the implementation, the metadata may include other types of data, such as gain data, trajectory data, etc.

According to this implementation, block 315 involves receiving a first set of values corresponding to reference audio samples. In some such implementations, first set of values corresponding to reference audio samples were obtained at a reference time at which the metadata was synchronized with corresponding audio data.

Accordingly, the first set of values corresponding to reference audio samples may have been determined at a reference point. The first set of values corresponding to reference audio samples may have been determined during a reference time before the block of audio data was received in block 305. The reference time may have been a time during which the metadata was synchronized with reference audio data. The reference point may have been capable of associating the first set of values with the metadata that was received in block 310. The reference point may have been capable of transmitting the first set of values, at least one block of the reference audio data and the metadata from the reference point to the measurement point.

In some examples, the first set of values corresponding to reference audio samples may include a value corresponding to at least one sample from at least one of the N channels. In some implementations, the value corresponding to the at least one sample may correspond to a subset of a total number of bits of the at least one sample. In some such implementations, the subset may include the B most significant bits of the at least one sample. According to some examples, block 315 may involve receiving a value corresponding to at least one sample from each of the N channels. Blocks 305, 310 and 315 may, in some examples, involve receiving the audio data, metadata and first set of values corresponding to reference audio samples via an interface system, such as the interface system 205 of FIG. 2.

In this example, block 320 involves determining a second set of values corresponding to audio samples from the block of audio data. In some implementations, determining the second set of values may involve determining a value corresponding to the same sample number in at least one of the N channels. In some such implementations, determining the second set of values may involve determining a value corresponding to the first sample of the block in at least one of the N channels. In some examples, the first set of values and the second set of values are determined in the same manner or substantially the same manner. For example, determining the first set of values and determining the second set of values may both involve processing the same number of samples per channel, processing the same number of bits per sample, determining a value corresponding to the same sample number and/or determining the same type of "audio metric." Some examples of audio metrics are provided below.

In this example, block 325 involves making a comparison of the second set of values corresponding to audio samples and the first set of values corresponding to reference audio samples. According to this example, block 330 involves determining, based on the comparison, whether the block of audio data is synchronized with the metadata. Some examples are described below.

Figure 4:
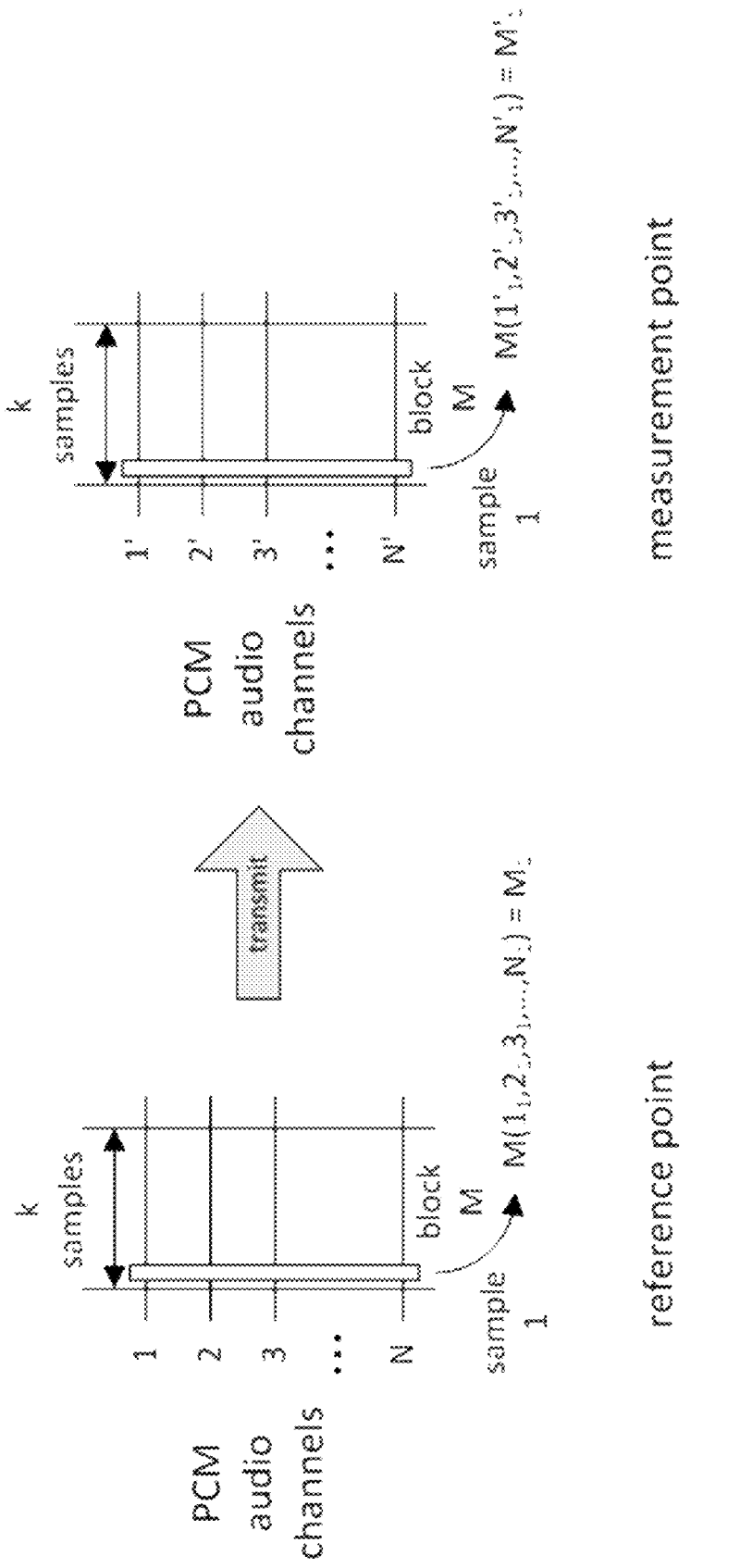
FIG. 4 provides examples of methods that may be performed at a reference point and at a measurement point.

FIG. 4 provides examples of methods that may be performed at a reference point and at a measurement point. Some aspects of these methods are examples of method 300 of FIG. 3. Accordingly, in some portions of the following discussion of FIG. 4, the corresponding blocks of FIG. 3 will be referenced.

An underlying assumption of the example shown in FIG. 4 is that the individual audio channels and the metadata are in time alignment at the reference point. Therefore, the audio samples at the reference point are examples of the "reference audio samples" referred to elsewhere in this disclosure. Moreover, in this example it is presumed that the audio channels and the associated metadata maintain bit accuracy between the reference point and the measurement point. Therefore, according this example, it is presumed that only the time alignment between the individual audio channels and/or the metadata may potentially be altered.

According to this implementation, at the reference point the first sample value of every block is recorded for each audio channel. The corresponding sample values are stored as the set $M_1$. The set of sample values $M_1$ is an example of the "first set of values corresponding to reference audio samples" referred to elsewhere herein. Accordingly, the set of sample values $M_1$ is an example of the first set of values corresponding to reference audio samples that may be transmitted with the audio data of block M and with associated metadata. In alternative examples, the second sample of every block, the third sample of every block or some other sample of every block may be used to determine the first set of values corresponding to reference audio samples. In some alternative examples, more than one sample per channel may be used to determine the first set of values corresponding to reference audio samples.

The value corresponding to a sample may or may not correspond to all of the bits of the sample, depending on the particular implementation. Some implementations may involve determining a value corresponding to only a subset of the total number of bits of a sample. Some such implementations may involve determining a value corresponding to only some number B of most significant bits (MSBs) of a sample, wherein B is one or more bits. Such implementations are potentially advantageous because they may reduce the number of bits required for transmission of the first set of values corresponding to reference audio samples.

In some examples, the number of bits required for transmission of the first set of values corresponding to reference audio samples may be reduced by sending reference audio samples for only a subset of audio channels. Such examples may also provide the potential advantage of simplifying the operations performed at a measurement point, e.g., the operations corresponding with blocks 320, 325 and 330 of FIG. 3. Accordingly, in some alternative examples, the values corresponding to reference audio samples are not necessarily determined for each one of the N channels. However, some implementations involve determining a value corresponding to at least one sample from at least one of the N channels to determine the first set of values corresponding to reference audio samples.

In some implementations, two or more audio channels may be treated as a group in transmission and known to be synchronized to one another at the measurement point. In this case sending the first audio sample for a single audio channel of the group is sufficient information for synchronizing all channels in the group. In addition, or as an alternative, in some examples the set of reference samples may be losslessly compressed prior to transmission by an appropriate method and decompressed after receipt by another device.

At the measurement point, a second set of values corresponding to audio samples from a received block of audio data are determined in this example. This is one example of block 320 of FIG. 3. In the example shown in FIG. 4, the second set of values are determined according to the first audio sample value of each block and each audio channel. In FIG. 4, $M'_1$ represents an example of the second set of values. However, other implementations may involve determining the second set of values in a different manner, e.g., as described above with reference to determining the first set of values at the reference point. The process for determining the second set of values at the measurement point should generally be the same, or in substantially the same, as the process for determining the first set of values at the reference point. For example, determining the first set of values and determining the second set of values may both involve processing the same number of samples per channel, processing the same number of bits per sample, determining a value corresponding to the same sample number, etc.

In an example of block 325 of FIG. 3, the first set of values ($M_1$) obtained from the reference point may be compared to the second set of values ($M'_1$) that are determined at the measurement point. It may then be determined whether the block of audio data is synchronized with the metadata (block 330 of FIG. 3). At least part of this determination may involve determining whether the audio channels are in time alignment with each other. If the first set of values obtained from the reference point equals the second set of values determined at the measurement point ($M_1 = M'_1$), in some examples it may be assumed that the audio channels are in the same time alignment as at the reference point.

However, if the first set of values does not equal the second set of values (in this example, if $M_1 \neq M'_1$), then a further analysis may be undertaken in an attempt to determine the time offset of the audio channels. In some instances, all audio channels may be offset equally. In this case, a search for a set of samples that corresponds to the reference point samples should be sufficient for identifying the offset. For example, if all audio channels have been delayed by 10 samples, then the set of sample values based on the $11^{th}$ audio sample at the measurement point should equal the reference set of sample values (in other words, $M_1$ should equal $M'_{11}$).

In some instances, each audio channel may have a different offset. In such cases each channel would need to be searched independently to find a sample value that matches a value in the first set of values. The offset for a particular channel could be determined according to the offset between the sample number in that channel and the sample number corresponding to the matching value in the first set of values.

The above-described search methods may be appropriate if the audio channels contain non-stationary audio signals of sufficient level in order to uniquely identify matching samples. During any period during which an audio channel contains no signal (for example, all zeros) or a static periodic audio signal (for example, a test tone) such methods will not be able to determine an accurate offset until a dynamic signal returns. These conditions can be identified, however, to flag an unreliable signal for offset estimation. For example, at the reference point an all-zero condition could be flagged by sending a special all-zero code for each audio channel with all zero samples. Even with dynamic audio signals it may be possible to match the wrong sample within a given block. However, in this case measuring alignment over a series of successive audio blocks is likely to identify the correct offset.

Figure 5:
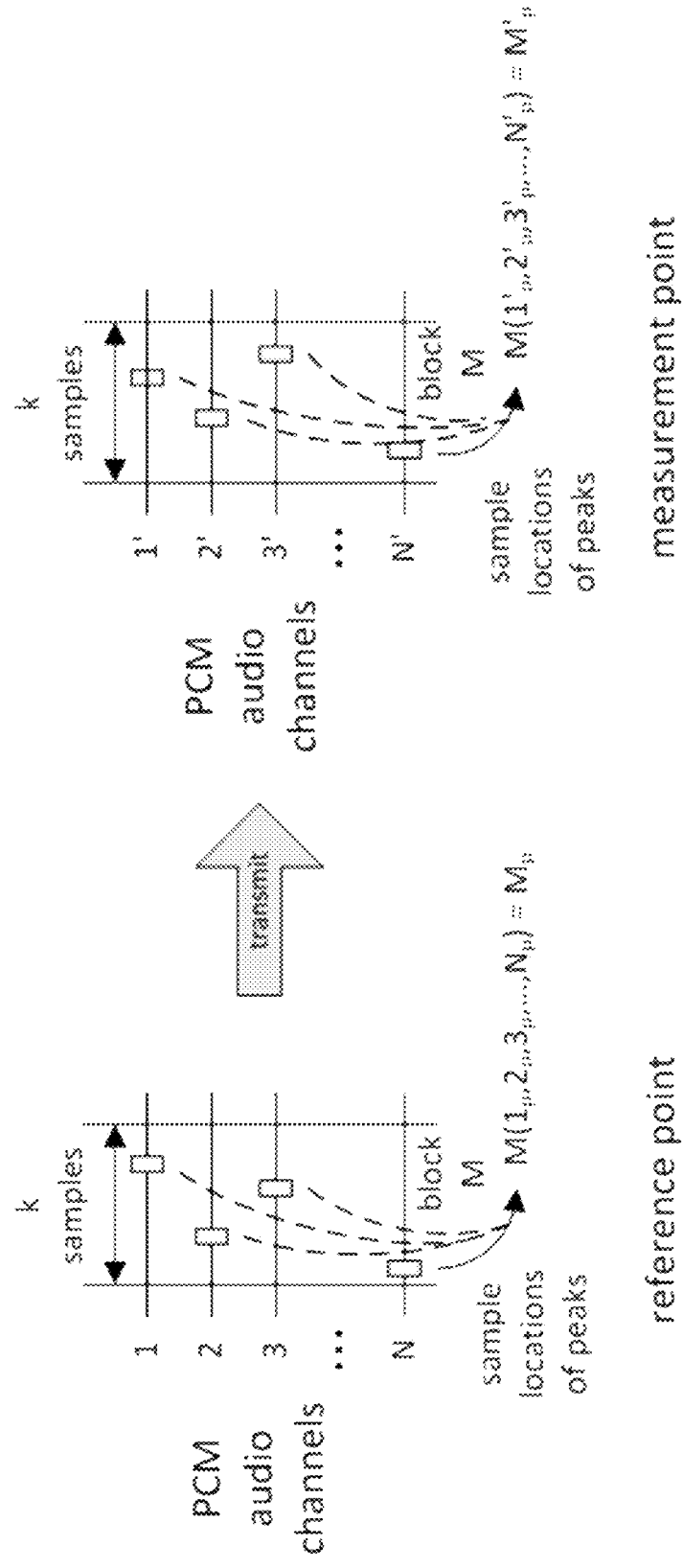
FIG. 5 provides alternative examples of methods that may be performed at a reference point and at a measurement point.

FIG. 5 provides alternative examples of methods that may be performed at a reference point and at a measurement point. The methods indicated in FIG. 5 may be applicable for instances in which the metadata maintains bit accuracy between the reference point and the measurement point but the audio channels may not. In such instances, searching for bit-exact samples will not identify correctly matching samples in all cases.

Some examples involve the identification of one or more sample locations corresponding to what may be referred to herein as an "audio metric." Examples of audio metric locations within a block of audio data may include the location of a peak sample value for the block or a location of a first zero crossing for the block. In some such methods, determining the second set of values may involve determining an audio metric location for at least one of the N channels.

However, the example shown in FIG. 5, determining the first set of values corresponding to reference audio samples at the reference point involves determining an audio metric location for each of the N channels. In this example, the audio metric locations correspond to the locations of peak sample values for each of the N channels. Accordingly, the set of sample values $M_p$ is an example of the first set of values corresponding to reference audio samples that may be transmitted with the audio data of block M and with associated metadata.

In this example, the measurement point performs a corresponding process: here, determining the second set of values corresponding to audio samples from the block of audio data involves determining an audio metric location for each of the N channels. In this example, the audio metric locations correspond to the locations of peak sample values for each of the N channels. The result is the set of sample values $M'_p$ shown in FIG. 5.

At the measurement point, the second set of values may be compared to the first set of values. If the two sets of values are equal, or approximately equal within a given threshold (in other words, if $M_p \approx M'_p$) then it can be assumed that the audio channels at the measurement point are in the same time alignment (within a given tolerance) as the audio channels at the reference point. The threshold of allowable deviation is application- and metric-dependent. For a metric of a peak sample location, some applications may consider a deviation of +/−1 msec (e.g., 48 samples with 48 kHz sampled PCM audio) reasonable. If not, a search as described above with reference to FIG. 4 may be undertaken, in an attempt to locate offsets between the matching sample locations at the reference and measurement points to determine the offset for each audio channel.

Alternatively, or additionally, in some examples the first set of values corresponding to reference audio samples determined at the reference point and the second set of values corresponding to audio samples determined at the measurement point may include what will be referred to herein as a "block metric" for at least one channel. For example, the first block metric may be based on two or more reference audio samples of at least one reference channel of a reference block of audio data. At the measurement point, determining the second set of values may involve determining a second block metric for at least one channel of a block of audio data received by the measurement point. The second block metric may be based on two or more samples of at least one channel of the audio data. In some implementations, determining the first set of values and determining the second set of values may involve determining first and second block metrics that are based on all audio samples in a block (e.g., the entire set of k samples shown in FIG. 5).

In some implementations, the first block metric and the second block metric may be based, at least in part, a root mean square (RMS) of sample values, a frequency-weighted RMS value and/or a loudness metric such as ITU-R BS.1770.

With various methods disclosed herein, although the offsets determined for a single block of any given audio channel may not be entirely reliable, performing the method for each block of a continuous series of blocks may substantially increase the reliability of the methods. Evaluating more than one type of value corresponding to audio samples can also increase reliability. For example, evaluating both a block metric and the locations of audio metrics may increase the reliability of the method described with reference to FIG. 5. Once an offset has been determined, the block metric can be derived at the measurement point (which may require audio samples from blocks before or after the block being analyzed, depending on the offset) and compared to the block metric from the reference point. If the two are exactly, or approximately equal (e.g., $M_{rms} \approx M'_{rms}$) then this is further conformation the alignment is correct. Such methods also can give confidence that the audio data at the measurement point has not been substantially modified since transmission from the reference point.

As with other methods disclosed herein, the methods described with reference to FIG. 5 can work satisfactorily if the audio channels contain dynamic audio signals of sufficient level in order to derive corresponding audio metrics and audio metric locations. For some methods disclosed herein, synchronization may be measured for every audio block. However, in some alternative methods disclosed herein, synchronization may be measured only for certain audio blocks, in order to reduce computational workload or the amount of data transmitted. For example, the first set of values corresponding to reference audio samples may only be sent every few blocks (e.g. every $10^{th}$ block) from the reference point. At the measurement point, in some examples the synchronization may be checked every few blocks even if the information is sent from the reference point for every block.

Various modifications to the implementations described in this disclosure may be readily apparent to those having ordinary skill in the art. The general principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

The invention claimed is:

1. A computer-implemented method of processing audio data, comprising:
   receiving, by a control system that includes at least one processor, a block of audio data, the block including N pulse code modulated (PCM) audio channels, including audio samples for each of the N channels;
   receiving, by the control system, metadata associated with the block of audio data;
   receiving, by the control system, a first set of values corresponding to reference audio samples;
   determining, by the control system, a second set of values corresponding to audio samples from the block of audio data;
   making, by the control system, a comparison of the second set of values corresponding to audio samples and the first set of values corresponding to reference audio samples; and
   determining, by the control system and based on the comparison, whether the block of audio data is synchronized with the metadata.

2. The computer-implemented method of claim 1, wherein the first set of values corresponding to reference audio samples was obtained at a reference time at which the metadata was synchronized with corresponding audio data.

3. The computer-implemented method of claim 1, wherein the first set of values corresponding to reference audio samples includes a value corresponding to at least one sample from at least one of the N channels.

4. The computer-implemented method of claim 3, wherein the value corresponding to the at least one sample corresponds to a subset of a total number of bits of the at least one sample.

5. The computer-implemented method of claim 4, wherein the subset includes B most significant bits of the at least one sample.

6. The computer-implemented method of claim 1, wherein determining the second set of values involves determining a value corresponding to a same sample number in at least one of the N channels.

7. The computer-implemented method of claim 6, wherein determining the second set of values involves determining a value corresponding to the first sample of the block in at least one of the N channels.

8. The computer-implemented method of claim 1, wherein determining the second set of values involves determining an audio metric for at least one of the N channels.

9. The computer-implemented method of claim 8, wherein a location of the audio metric is a location of a peak sample value for the block or a location of a first zero crossing for the block.

10. The computer-implemented method of claim 1, wherein the first set of values includes a first block metric for at least one channel, the first block metric being based on two or more reference audio samples of at least one reference channel of a reference block of audio data, further comprising:
    determining, by the control system, a second block metric for at least one channel of the block of audio data, the second block metric being based on two or more samples of the at least one channel, wherein determining whether the block of audio data is synchronized with the metadata is based, at least in part, on a comparison of the first block metric with the second block metric.

11. An apparatus of processing audio data, comprising:
    an interface system; and
    a control system configured to:
        receiving, via the interface system, a block of audio data, the block including N pulse code modulated (PCM) audio channels, including audio samples for each of the N channels;
        receiving, via the interface system, metadata associated with the block of audio data;
        receiving, via the interface system, a first set of values corresponding to reference audio samples;
        determining a second set of values corresponding to audio samples from the block of audio data;
        making a comparison of the second set of values corresponding to audio samples and the first set of values corresponding to reference audio samples; and
        determining, based on the comparison, whether the block of audio data is synchronized with the metadata.

12. The apparatus of claim 11, wherein the first set of values corresponding to reference audio samples was obtained at a reference time at which the metadata was synchronized with corresponding audio data.

13. The apparatus of claim 11, wherein the first set of values corresponding to reference audio samples includes a value corresponding to at least one sample from at least one of the N channels.

14. The apparatus of claim 13, wherein the value corresponding to the at least one sample corresponds to a subset of a total number of bits of the at least one sample.

15. The apparatus of claim 14, wherein the subset includes B most significant bits of the at least one sample.

16. The apparatus of claim 11, wherein determining the second set of values involves determining a value corresponding to a same sample number in at least one of the N channels.

17. The apparatus of claim 16, wherein determining the second set of values involves determining a value corresponding to the first sample of the block in at least one of the N channels.

18. The apparatus of claim 11, wherein determining the second set of values involves determining an audio metric for at least one of the N channels.

19. The apparatus of claim 18, wherein a location of the audio metric is a location of a peak sample value for the block or a location of a first zero crossing for the block.

20. A non-transitory computer readable medium containing instructions that when executed by processor perform the method of claim 1.

* * * * *